United States Patent [19]

Crescenzi

[11] 4,120,071
[45] Oct. 17, 1978

[54] DUAL WHEEL CASTER

[75] Inventor: Donald C. Crescenzi, Branford, Conn.

[73] Assignee: Stewart-Warner Corporation, Chicago, Ill.

[21] Appl. No.: 686,732

[22] Filed: May 17, 1976

[51] Int. Cl.$^2$ ............................................. B60B 33/00
[52] U.S. Cl. ........................................ 16/37; 16/38; 16/47
[58] Field of Search ................ 16/37, 38, 39, 47, 45, 16/46, 48

[56] References Cited

U.S. PATENT DOCUMENTS

| 42,382 | 4/1864 | Knisely | 16/37 |
|---|---|---|---|
| 3,040,370 | 6/1962 | Ford | 16/38 X |
| 3,648,325 | 3/1972 | Cartwright et al. | 16/46 |
| 3,858,271 | 1/1975 | Howard et al. | 16/39 X |
| 3,869,105 | 3/1975 | Daniels | 16/39 X |
| 3,894,310 | 7/1975 | Screen | 16/47 |
| 3,977,040 | 8/1976 | Sugasawara | 16/45 |
| 3,997,938 | 12/1976 | Pinaire et al. | 16/45 |
| 4,024,601 | 5/1977 | Harlang | 16/47 X |
| 4,054,964 | 10/1977 | Kaneko | 16/20 |

FOREIGN PATENT DOCUMENTS

| 122,566 | 10/1946 | Australia | 16/38 |
|---|---|---|---|
| 880,607 | 9/1971 | Canada | 16/45 |
| 705,067 | 3/1965 | Canada | 16/45 |
| 1,920,995 | 3/1969 | Fed. Rep. of Germany | 16/47 |
| 2,400,630 | 7/1975 | Fed. Rep. of Germany | 16/47 |
| 2,529,201 | 5/1976 | Fed. Rep. of Germany | 16/45 |
| 1,382,572 | 11/1964 | France | 16/45 |
| 20,044 of | 1896 | United Kingdom | 16/38 |

*Primary Examiner*—Price C. Faw, Jr.
*Assistant Examiner*—Conrad L. Berman
*Attorney, Agent, or Firm*—Dillis V. Allen; Augustus G. Douvas

[57] ABSTRACT

A dual wheel caster assembly consisting of an arcuate central horn carrying an axle with projections on either side of the horn that rotatably receive wheels. The axle has recesses that receive annular projections on the wheels for the purpose of retaining the wheels in position.

A vertical opening in the horn receives a vertical pintle having a portion projecting upwardly from the horn adapted to be received in an associated piece of furniture. This pintle has two spaced thrust surfaces, a lower one adapted to directly engage the plastic horn and the other one adapted to engage a one piece plastic bearing.

The two thrust surfaces are spaced such that the lower thrust surface initially carries most of the load until a certain amount of wear causes the load to be distributed between the two thrust surfaces from the associated piece of furniture.

3 Claims, 6 Drawing Figures

U.S. Patent  Oct. 17, 1978  4,120,071
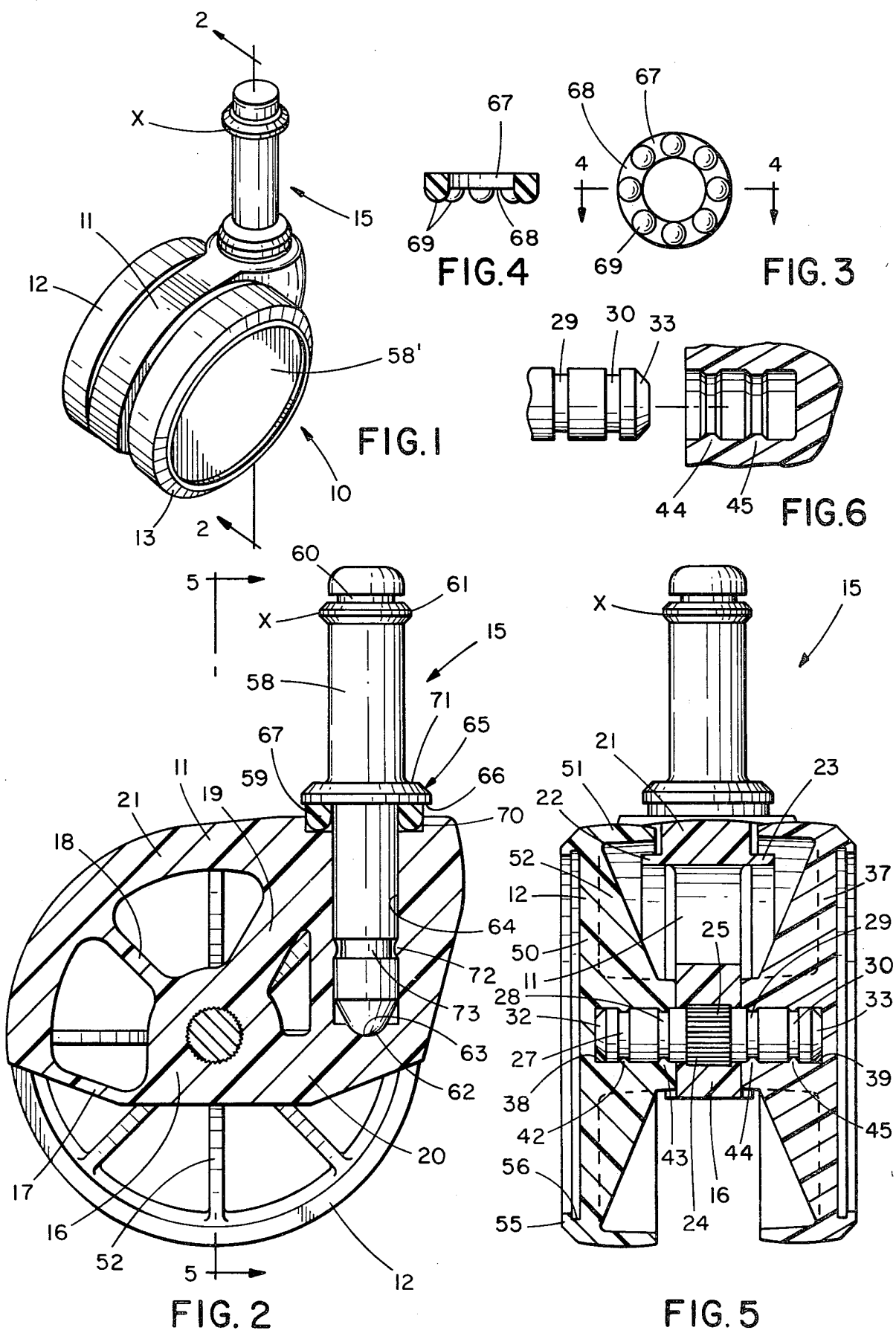

DUAL WHEEL CASTER

BACKGROUND OF THE PRESENT INVENTION

There have been provided in the past a plurality of dual wheel caster assemblies. These, in so far as I am aware, have been heavy duty constructions, complicated in construction and expensive to manufacture. There has not been provided in the past an inexpensive plastic dual wheel caster assembly designed for medium load ranges suitable for commercial office furniture.

It is therefore a primary object of the present invention to provide a relatively inexpensive plastic dual wheel caster assembly that is rugged in construction while at the same time being very simple to manufacture.

SUMMARY OF THE PRESENT INVENTION

According to the present invention a caster assembly is provided with a central horn carrying an axle upon which one or more wheels may be easily snapped on during assembly. This is accomplished by providing the axle with recesses that receive annular inward projections on axle receiving apertures in the wheels. This provides a horn and wheel assembly that is extremely low in cost and simple to manufacture and assemble.

Also provided is a vertical pintle assembly having a conical lower thrust surface that directly engages a complementary surface in the horn itself. An upper flange provides a second thrust surface so that the pintle is supported at two points within the horn in an axial direction. The thrust surfaces are spaced so that the lower thrust surface absorbs a major portion of the load during initial use. However, upon a continued use, as the lower thrust surface seats more fully and wears somewhat, the upper flange thrust surface will absorb a proportionately greater share of the load. As a result of this, the total swivel action of the caster is increased resulting in a smooth strong simple bearing using a minimum number of parts, components and assembly labor.

The upper thrust flanges rides on a one-piece plastic annular bearing that is very simple and inexpensive to manufacture and is constructed of an annular ring with semispherical integral surfaces around the ring.

BRIEF DESCRIPTION OF THE DRAWINGS

FIG. 1 is a fragmentary elevation of the present dual wheel caster assembly;

FIG. 2 is an enlarged longitudinal section taken generally along line 2—2 of FIG. 1;

FIG. 3 is a subassembly of the integral upper bearing;

FIG. 4 is a cross-section of the bearing taken generally along line 4—4 of FIG. 3;

FIG. 5 is a cross-section taken generally along line 5—5 of FIG. 2; and

FIG. 6 is an enlarged fragmentary section of the axle assembly.

DETAILED DESCRIPTION OF THE PREFERRED EMBODIMENT

Referring to the drawings and particularly FIG. 1, a dual wheel swivel caster assembly 10 is illustrated according to the present invention. Caster assembly 10 consists generally of a central supporting horn 11 which rotatably carries wheels 12 and 13. A pintle assembly 15 is received in the horn 11 and projects upwardly for the purpose of insertion into a cooperating recess on a lower surface of an associated piece of furniture to be supported on the swivel caster.

As viewed in FIGS. 2 and 5, the horn 11 includes a central semicylindrical portion 16 having spokes 17, 18, 19 and 20 which are formed integrally with an outer arcuate portion 21.

As viewed in FIG. 5, the outer portion 21 has integral flanges 22 and 23.

An axle 24 is carried in central portion 16 of the horn 11 and has a central splined portion 25 preventing rotation of the axle 24 with respect to the horn 11. Axle 24 has spaced annular recesses 27, 28, 29 and 30 with conical ends 32 and 33.

Wheels 12 and 13 have central dead ended bores or recesses 38 and 39 for receiving the projecting portions of the axle 24.

To provide a snap action fit of the wheels 12 and 13 on the axle 24 and to hold the wheels in position on the axle, annularly inwardly extending projections 42, 43, 44 and 45 are provided. This combination of elements reduces the cost of the assembly and also the cost of manufacture.

The wheels 12 and 13 are identical in construction so that reference will be made to wheel 12 with the understanding that the description applies as well to wheel 37. The wheel 12 is an integral plastic molding having a side face 50 and an annular rim 51. Reinforcing tapered ribs 52 are provided as seen in both FIGS. 2 and 5. Projecting from the side panel 50 is a flange 55 defining an annular recess 56 that is adapted to receive a hub member 58' as shown in FIG. 1.

The pintle assembly 15 consists of a stepped shaft having an upper portion 58 and a reduced lower portion 59. The upper portion 58 has a recess as indicated at 60 for receiving a ring 61 that is adapted to lock the caster into the complementary receiving member in the bottom of the furniture piece.

The pintle has a primary thrust member 62 of conical shape having a rounded apex that is received in a complementary rounded conical recess 63 integral with the horn 11 at the bottom of dead ended bore 64 in the horn.

A secondary thrust surface is provided by a flange 65 having a thrust surface 66. The thrust surface 66 engages an integral plastic acetal bearing 67 shown in FIGS. 2, 3 and 4. As seen in FIGS. 3 and 4, the annular bearing 67 includes an annular portion 68 with integrally molded semispherical projections 69 extending downwardly therefrom. Bearing 67 engages counterbore 70 to provide the proper thrust surface against the horn 11 by the associated piece of furniture engaging upper surface 71 of the flange 65.

The surface 66 is spaced sufficiently from the conical portion 62 such that the primary load of the furniture is initially placed upon the horn by the thrust surface 62. However, upon seating of the horn and some initial wear the upper flange 65 begins to carry a more proportionate share of the load to provide a smooth swivel action and a strong and simple bearing using a minimum of components and parts.

Pintle 15 is held in horn recess by annular projection 72 on the horn being received in recess 73 in the pintle.

What is claimed is:

1. A caster assembly, comprising; a horn for supporting a wheel, a generally vertical bore in said horn extending from an upper surface of the horn and terminating within the horn to form a rounded lower thrust surface in the horn, a bearing surface on the upper surface of the horn, a vertical pintle in the horn bore having an integral upper flange having a diameter substantially greater than the diameter of the bore, said flange having a flat lower surface engaging the bearing surface on the horn to transmit downward axial thrust load between the horn and the pintle, said pintle having an integral rounded end at the bottom thereof defining a lower thrust bearing surface, said pintle being sufficiently long so that the lower thrust bearing surface engages the rounded lower thrust surface on the horn to transmit downward axial thrust load betweem the horn and the pintle.

2. A caster assembly as defined in claim 1, wherein the pintle is sufficiently long so that the lower thrust bearing surface on the pintle and the rounded thrust surface on the horn carry a greater thrust load than the lower surface of the flange and the bearing surface on the horn.

3. A caster assembly, comprising; horn means for supporting at least one wheel, wheel means rotatably supported on said horn means, a vertical pintle in said horn means and projecting therefrom, said pintle having two spaced axial thrust surfaces thereon, one of said thrust surfaces being an integral annular flange adjcent the top of the horn, one of said thrust surfaces being an integral rounded portion on the lower end of said pintle, said lower thrust surface directly engaging a complementary thrust surface integrally formed with the horn, said spaced thrust surfaces on said pintle being sufficiently spaced so that the lower one carries a major portion of the load, a thrust ring between the upper thrust surface on the pintle and the horn means, said thrust ring comprising a one piece plastic ring with semispherical projections thereon, and said pintle having a recess for securing an annular projection and holding said pintle in position.

* * * * *